United States Patent
Berglund et al.

(10) Patent No.: US 6,878,797 B2
(45) Date of Patent: Apr. 12, 2005

(54) SYNTHESIS AND APPLICATIONS OF POLYMALEIMIDE

(75) Inventors: Kris A. Berglund, Okemos, MI (US); Parminder Agarwal, East Lansing, MI (US); Qiuyue Yu, Fishers, IN (US); Adam Harant, Boulder, CO (US)

(73) Assignees: Board of Trustees of Michigan State University, East Lansing, MI (US); Applied CarboChemicals, Alto, MI (US)

( * ) Notice: Subject to any disclaimer, the term of this patent is extended or adjusted under 35 U.S.C. 154(b) by 0 days.

(21) Appl. No.: 10/125,933

(22) Filed: Apr. 19, 2002

(65) Prior Publication Data

US 2003/0199664 A1 Oct. 23, 2003

(51) Int. Cl.[7] .................. C08G 69/08; C08G 73/00; C08G 63/00; C08F 6/00; C08F 4/46
(52) U.S. Cl. .................. 528/170; 528/310; 528/322; 528/328; 528/345; 528/363; 528/367; 528/480; 528/488; 526/173; 526/210; 526/212; 526/262; 526/282; 525/282; 525/309; 510/108; 510/317; 510/318; 510/531; 252/175
(58) Field of Search .................. 528/170, 328, 528/310, 322, 345, 363, 480, 367, 488; 525/282, 309; 252/175; 510/108, 531, 317, 318, 361; 526/173, 262, 282, 210, 212

(56) References Cited

U.S. PATENT DOCUMENTS

| | | | |
|---|---|---|---|
| 5,152,902 A | | 10/1992 | Koskan et al. |
| 5,393,868 A | | 2/1995 | Freeman et al. |
| 5,668,231 A | * | 9/1997 | Varshney et al. ........... 526/173 |
| 5,981,691 A | | 11/1999 | Sikes |
| 6,635,188 B1 | * | 10/2003 | Berglund et al. ............. 252/70 |

FOREIGN PATENT DOCUMENTS

JP 69009394 B * 4/1969

OTHER PUBLICATIONS

Matsubara et al., Macromol. 30: 2305–2312 (1997).
Wolk et al., Macromol. 27: 7613–7620 (1994).
Mosig et al., Ind. Eng. Chem. Res. 36: 2163–2170 (1997).
Kojima et al., J. Polym. Sci. Polym. A–1 1: 1121–1131 (1966).
Tawney et al., J. Org. Chem. 26: 15–21 (1961).
Bamford and Burley, Polymers 14: 395 (1973).
Haas et al., J. Polym. Sci. Polym. Chem. Ed. 11: 327–343 (1973).
Haas, J. Polym. Sci. Polym. Chem. Ed. 11: 315–318 (1973).
Haas et al., J. Polym. Sci. Polym. Chem. Ed. 13: 2327–2334 (1975).
Bamford et al., Trans. Faraday Soc. 66: 2612–2621 (1970).
Craggs et al., Analyst 104: 961–972 (1979).

* cited by examiner

Primary Examiner—P. Hampton-Hightower
(74) Attorney, Agent, or Firm—Ian C. McLeod

(57) ABSTRACT

A process for producing alkali metal polymaleimide salts by alkaline hydrolysis of maleimide polymers prepared by polymerization of maleimide monomers in the presence of a metal oxide and alcohol initiator or a base. In particular, the process produces alkali metal polymaleimide salts with particular ratios of C—N and C—C connected maleimide-derived monomer units which are dependent on the particular initiator used to synthesize the maleimide polymer. The alkali metal polymaleimide salts, which have chelating and anti-scaling properties, are useful as chelating agents and detergent builders and as such are suitable biodegradable replacements for synthetic polymers and sodium polyaspartate.

25 Claims, 4 Drawing Sheets

SYNTHESIS AND APPLICATIONS OF POLYMALEIMIDE

CROSS-REFERENCE TO RELATED APPLICATION

Not Applicable.

STATEMENT REGARDING FEDERALLY SPONSORED RESEARCH OR DEVELOPMENT

Not Applicable.

REFERENCE TO A "COMPUTER LISTING APPENDIX SUBMITTED ON A COMPACT DISC"

Not Applicable.

BACKGROUND OF THE INVENTION (1) Field of the Invention

The present invention relates to a process for producing alkali metal polymaleimide salts by alkaline hydrolysis of maleimide polymers prepared by polymerization of maleimide monomers in the presence of a metal oxide and alcohol initiator or a base. In particular, the process produces alkali metal polymaleimide salts with particular ratios of C—N and C—C connected maleimide-derived monomer units which are dependent on the particular initiator used to synthesize the maleimide polymer. The alkali metal polymaleimide salts, which have chelating and anti-scaling properties, are useful as chelating agents and detergent builders and as such are suitable biodegradable replacements for synthetic polymers and sodium polyaspartate.

(2) Description of Related Art

Polycarboxylate compounds, in particular, polyacrylates and its copolymers, are commonly used as dispersants and anti-scalants in water-treatment processes and in detergents (Freeman et al., ACS Symposium Series 626, American Chemical Society, Washington, D.C. pp. 118–136 (1996)). Polyacrylates and its copolymers are primarily used in low-phosphate or phosphate-free detergents to minimize eutrophication of lakes and rivers, which is caused by introducing high concentrations of phosphorus compounds into the water stream.

Annually, several hundred million pounds of synthetic polymers are consumed for their high performance as chelating agents and detergent builders. After use, these synthetic polymers are released into the environmental waters. As a consequence, there is a need to evaluate the effect these polymers have on the environment. The need is particularly acute for those synthetic polymers which are not completely decomposed by natural processes (Freeman et al., ACS Symposium Series 626, American Chemical Society, Washington, D.C. pp. 118–136 (1996)). Because of the low biodegradability of many of these synthetic polymers, much effort has been devoted towards finding biodegradable polymers which can be used to replace the synthetic polymers. One such biodegradable polymer is a derivative of aspartic acid polymers.

The biodegradability, excellent chelating ability, and anti-scaling properties of sodium polyaspartate (SPA) make SPA a suitable replacement for polyacrylic acid. SPA is commonly prepared by the hydrolysis of polysuccinate with sodium hydroxide solution and is a mixture of two isomers, alpha and beta subunits, as shown in FIG. 1. The structure of SPA and the ratio of the two isomers has been determined by $^1$H NMR spectroscopy (Matsubara et al., Macromol. 30: 2305–2312 (1997); Wolk et al., Macromol. 27: 7613–7620 (1994)).

At present, the monomers which are used to synthesize polysuccinate are aspartic acid, maleic acid, fumaric acid, maleamic acid, or ammonium salt of maleic acid (U.S. Pat. No. 5,393,868 to Freeman et al.; Mosig et al., Ind. Eng. Chem. Res. 36: 2163–2170 (1997); U.S. Pat. No. 5,981,691 to Sikes). However, the process for synthesizing polysuccinate from these monomers is complex and uneconomical because of the high temperatures and the long process times involved. The only attempt to use maleimide as the monomer is disclosed in Japanese Patent No. 65-009394B, which discloses a base-catalyzed process using the maleimide monomer in the presence of a vinyl polymerization inhibitor. However, the process has not been used for the preparation of polysuccinate on a commercial scale because of the complexity of the process and its high cost.

Therefore, a need remains for a simple and low cost method for producing biodegradable polymers which can replace the synthetic polymers currently being used as chelators and detergent builders.

SUMMARY OF THE INVENTION

The present invention provides a process for producing alkali metal polymaleimide salts by alkaline hydrolysis of maleimide polymers prepared by polymerization of maleimide monomers in the presence of a metal oxide and alcohol initiator or a base. In particular, the process produces alkali metal polymaleimide salts with particular ratios of C—N and C—C connected maleimide-derived monomer units which are dependent on the particular initiator used to synthesize the maleimide polymer. The alkali metal polymaleimide salts, which have chelating and anti-scaling properties, are useful as chelating agents and detergent builders and as such are suitable biodegradable replacements for synthetic polymers and sodium polyaspartate.

Therefore, the present invention provides a process for the preparation of an alkali metal polymaleimide salt which comprises (a) anhydrously polymerizing maleimide in the presence of a metal catalyst and any alcohol initiator to produce a maleimide polymer wherein the maleimide polymer has mixed C—C and C—N bonds between maleimide-derived units of the maleimide polymer; and (b) hydrolyzing the maleimide polymer with an alkali metal base at 10 to 100° C. for at least 1 hour to produce the alkali metal polymaleimide salt.

In particular embodiments, the maleimide polymer is synthesized by bulk polymerization. In further embodiments, the maleimide polymer is polymerized in a solvent.

In an embodiment further still, the metal catalyst is selected from the group consisting of PbO, SnO, Sn(2-ethylhexanoate). Preferably, the metal catalyst is PbO. In a further embodiment, the alcohol initiator is tert-butyl benzyl alcohol.

The present invention further provides the alkali metal polymaleimide salt prepared by the above process.

The present invention further provides a process for the preparation of an alkali metal polymaleimide salt which comprises (a) polymerizing maleimide in an aqueous solution containing a base to produce a maleimide polymer wherein the maleimide polymer has mixed C—C and C—N bonds between maleimide-derived units of the maleimide polymer; and (b) hydrolyzing the maleimide polymer with an alkali metal base at 10 to 100° C. for at least 1 hour to produce the alkali metal polymaleimide salt.

In particular embodiments of the process, the base is KOH and the alkali metal base is NaOH.

The present invention further provides the alkali metal polymaleimide salt prepared by the above process.

Therefore, the present invention provides an alkali metal polymaleimide salt which comprises mixed C—C and C—N bonds between the maleimide-derived units of the alkali metal polymaleimide salt.

The present invention further provides in a detergent composition, the improvement which comprises an alkali metal polymaleimide salt which comprises mixed C—C and C—N bonds between maleimide-derived units of the alkali metal polymaleimide salt, wherein the alkali metal polymaleimide salt exchanges the alkali metal with calcium ions in water containing the detergent.

In particular embodiments, the detergent composition contains at least 10% by weight of the alkali metal polymaleimide salt or contains up to 80% by weight of the alkali metal polymaleimide salt.

The present invention further provides a process for the preparation of a maleimide polymer having mixed C—C and C—N bonds between maleimide-derived units of the maleimide polymer which comprises anhydrously polymerizing maleimide in the presence of a metal catalyst and any alcohol initiator to produce the maleimide polymer having the mixed C—C and C—N bonds between the maleimide-derived units of the maleimide polymer.

In particular embodiments, the maleimide polymer is synthesized by bulk polymerization. In further embodiments, the maleimide polymer is polymerized in a solvent.

In an embodiment further still, the metal catalyst is selected from the group consisting of PbO, SnO, Sn(2-ethylhexanoate). Preferably, the metal catalyst is PbO. In a further embodiment, the alcohol initiator is tert-butyl benzyl alcohol.

The present invention further provides the maleimide polymer prepared by the above process.

The present invention further provides a process for the preparation of a maleimide polymer having mixed C—C and C—N bonds between maleimide-derived units of the maleimide polymer which comprises polymerizing maleimide in an aqueous solution containing a base to produce the maleimide polymer having the mixed C—C and C—N bonds between the maleimide-derived units of the maleimide polymer.

In particular embodiments, the base is KOH.

The present invention further provides the maleimide polymer prepared by the above process.

OBJECTS

It is an object of the present invention to provide biodegradable polymers which can chelate calcium and can be used as detergent builders. In particular, it is an object to provide biodegradable polymers which are synthesized from maleimide.

However, because current methods for preparing polymaleimides are complex and expensive, it is also an object of the present invention to provide a process for preparing polymaleimides which is simple and cost effective.

These and other objects of the present invention will become increasingly apparent with reference to the following drawings and preferred embodiments.

DETAILED DESCRIPTION OF THE INVENTION

All patents, patent applications, government publications, government regulations, and literature references cited in this specification are hereby incorporated herein by reference in their entirety. In case of conflict, the present description, including definitions, will control.

The present invention provides a process for producing an alkali metal polymaleimide salt by polymerization in an aqueous solution containing maleimide and a base such as KOH or bulk polymerization of maleimide using a metal catalyst comprising a metal oxide such as PbO, SnO, or Sn(2-ethyl hexanoate) in the presence of any alcohol initiator such as t-butyl benzyl alcohol to produce a maleimide polymer which is then hydrolyzed in the presence of an alkali metal base such as NaOH or lactic acid salt to produce the alkali metal polymaleimide salt.

Figure 1:
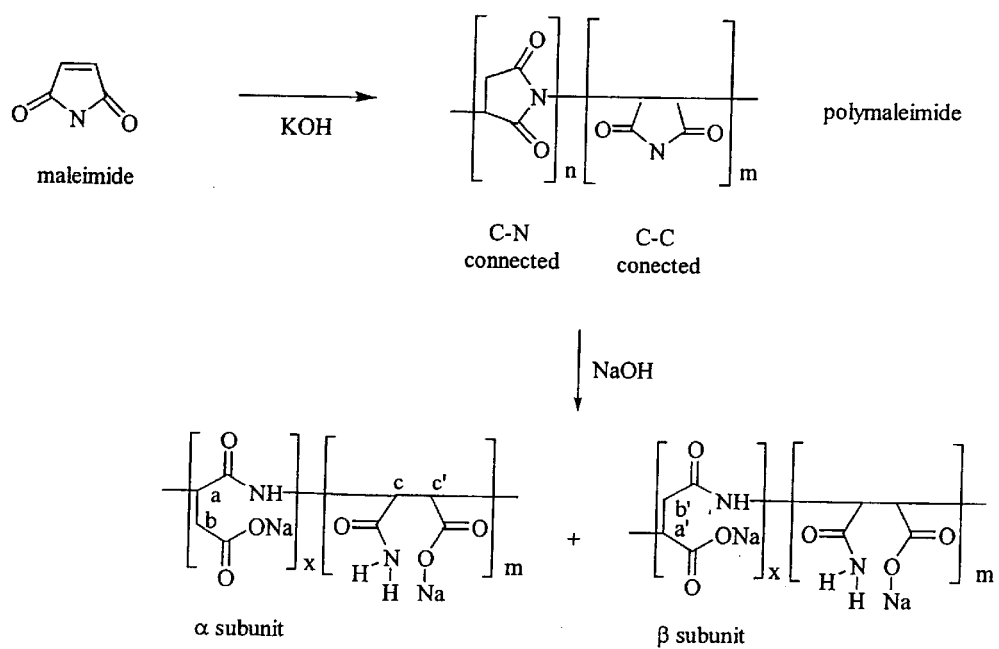
FIG. 1 illustrates the synthesis of alkali metal polymaleimide salts from maleimide.

The process produces an alkali metal polymaleimide salt that consists of a mixture of C—N and C—C bonds between the maleimide-derived units of the maleimide polymer (FIG. 1). The ratio of C—N to C—C bonds depends on the particular conditions used to polymerize the maleimide monomers. By selecting particular polymerization conditions, alkali metal polymaleimide salt can be produced that consist of 40 to 80% C—N bonds. In general, under anionic polymerization conditions, alkali metal polymaleimide salts are produced wherein the C—N bond percentage is high whereas under bulk polymerization conditions using a metal oxide-alcohol initiator, alkali metal polymaleimide salts are produced wherein the C—N percentage is low.

The molecular weight of the alkali metal polymaleimide salt produced from the maleimide polymer is dependent on the percentage of C—N bonds in the maleimide polymer. The anionic polymerization process produces a maleimide polymer with a high C—N bond percentage and hydrolysis produces alkali metal polymaleimide salts with a molecular weight between about 1,000 and 4,000 depending on the particular polymerization conditions. The bulk polymerization process using a metal oxide-alcohol initiator produces a maleimide polymer with a low C—N bond percentage and hydrolysis produces a alkali metal polymaleimide salt with a molecular weight of about 11,000.

Therefore, the process of the present invention proceeds in two steps. In the first step, maleimide monomers are polymerized into maleimide polymers consisting of a mixture of C—N and C—C bonds between the maleimide-derived subunits. In the prior art (Japanese Patent No. 44-09394B), polymerization of maleimide is effected in the presence of vinyl polymerization inhibitor to suppress formation of C—C bond formation between the maleimide-derived monomers. In general, polymerization using a base to effect the polymerization produces maleimide polymers with a high percentage of C—N bonds between the maleimide derived subunits whereas polymerization using a metal oxide-alcohol initiator produces maleimide polymers with a high percentage of C—C bonds between the maleimide-derived subunits. The maleimide polymers produced by the process of the present invention which consist of particular ratios of C—C and C—N bonds are novel and are useful as plasticisers and polylactates.

To produce a maleimide polymer containing a high percentage of C—C bonds, maleimide is melt-polymerized under a vacuum using a ratio of maleimide to metal oxide-alcohol initiator of about 1000. Preferably, the ratio is 100. The metal oxide-alcohol initiator comprises a one to one amount of metal oxide in an alcohol. The metal oxide is selected from the group consisting of PbO, SnO, Sn(2-ethylhexanoate), and CuO. Preferably, the metal oxide is PbO. The alcohol is selected from the group consisting of t-butyl benzyl alcohol, isoamyl alcohol, and butyl alcohol. Preferably, the alcohol is t-butyl benzyl alcohol. The polymerization is conducted by incubating the mixture of maleimide and metal oxide-alcohol initiator between about 100 to 200° C., preferably at 180° C. In general, allowing the reaction proceed for one to two hours is sufficient to polymerize the maleimide. The maleimide polymer is recovered from the reaction by precipitating in an organic solvent such as ethyl acetate or methanol.

To produce a maleimide polymer containing a high percentage of C—N bonds, maleimide is mixed at 0° C. with a base such as KOH. The ratio of maleimide to base is about 10 to 1. The reactants are continuously stirred at 0° C. and polymerization is considered complete when the mixture changes from white to red, usually in about a minute. The maleimide polymer is recovered from the reaction by drying over heat. Alternatively, maleimide is mixed at about 70° C. with a base such as KOH. The ratio of maleimide to base is about 100 to 1. The reactants are incubated at 70° C. for a time sufficient to convert the maleimide to the maleimide polymer, which is determined when the mixture turns from colorless to red and a pink precipitate is formed. The maleimide polymer is the pink precipitate which is recovered by filtration and drying.

To hydrolyze the maleimide polymers produced by any one of the foregoing to alkali metal polymaleimide salts, the dried maleimide polymer is dissolved in water to make a solution of 10 to 12 weight percent of the maleimide polymer. The solution is mixed with about one equivalent of a base such as sodium hydroxide or lactic acid salt. The maleimide polymers are hydrolyzed at about 85° C. for about 10 to 12 hours. Afterwards, the alkali metal polymaleimide salt is recovered by lyophilization followed by dissolving the lyophilizate in water to produce a solution containing about 10 to 12 weight percent of the alkali metal polymaleimide and precipitating the alkali metal polymaleimide salt with 10 times the volume of ethanol.

The alkali metal polymaleimide salts produced by the process of the present invention are effective as inhibitors of calcium carbonate precipitation. The alkali metal polymaleimide salts produced by the metal oxide-alcohol initiator process, in particular the alkali metal polymaleimide polymers produced using PbO-alcohol initiator process, are particularly effective as an inhibitor of calcium carbonate precipitation. The alkali metal polymaleimide salts produced by the process of the present invention are effective at chelating calcium and, therefore, are effective as anti-scaling agents. The alkali metal polymaleimide salts produced by the metal oxide-alcohol initiator process, in particular the alkali metal polymaleimide polymers produced using PbO-alcohol initiator process, are particularly effective as anti-scaling agents.

In light of the ability of the alkali metal polymaleimide salts produced by the process of the present invention to inhibit precipitation of calcium and its effectiveness as an anti-scaling agent, the process of the present invention produces alkali metal polymaleimide salts which are particularly useful as detergent builders. The alkali metal polymaleimide salts are an effective replacement for the synthetic polymers which are used as detergent builders, are inexpensive to prepare by the process of the present invention, and are biodegradable. Furthermore, the alkali metal polymaleimide salts, in particular the alkali metal polymaleimide salts produced using the metal oxide-alcohol initiator process, are more effective as detergent builders than sodium polyaspartate, a biodegradable detergent builder.

The following examples are intended to promote a further understanding of the present invention.

EXAMPLE 1

This example illustrates the synthesis of an alkali metal polymaleimide salt in a bulk polymerization process that uses a metal oxide initiator such as PbO, SnO, or Sn(2-ethylhexanoate)$_2$ in combination with an alcohol initiator such as t-butyl benzyl alcohol to produce a maleimide polymer which is hydrolyzed to the alkali metal polymaleimide salt.

In general, ACS reagent grade materials and solvents were used without further purification. However, maleimide, which was purchased from TCI America, was recrystallized two times from ethyl acetate before use. Proton nuclear resonance ($^1$H NMR) analyses were performed at room temperature on a Varian Gemini-300 spectrophotometer with solvent proton signals used as the chemical shift standards. Gel permeation chromatography (GPC) was performed using a BioRad system with ultraviolet and refractive index detectors. The column used for analysis was a GMPWXL, 7.8 mm×30 cm, column with a particle size of 13 μm from Supelco. Unless otherwise indicated, the mobile phase was 0.05 M sodium sulfate in HPLC grade water, the flow rate was 0.6 ml/min, and the temperature was maintained at 30° C. The calibration curves for the GPC measurements were obtained from sodium polyaspartate standards with a low molecular weight distribution. Potentiometric measurements were preformed with the calcium selective 97-20 IONPLUS electrode from Orion Research, Inc.

In separate solvent-free polymerization reactions, maleimide was melt-polymerized under a vacuum in a sealed glass tube made from 1 mm (⅜ inch) diameter glass tubing. Each tube contained 0.5 mg maleimide and an appropriate amount (about 0.005) of either (1) PbO, (2) SnO, or (3) Sn(2-ethylhexanoate)$_2$ in combination with an alcohol initiator such as t-butyl benzyl alcohol. The contents of the glass tubes were freeze-thaws three times and then heat sealed while the contents were under a vacuum. The sealed tubes were immersed in a preheated oil bath maintained at an appropriate temperature (usually 180° C.). At the end of the polymerization reactions, the tubes were cooled and opened. The maleimide polymer was precipitated in an appropriate solvent such as ethyl acetate or methanol. A portion of the contents from each tube was removed and evacuated to dryness and analyzed by NMR for conversion.

Next, the maleimide polymer precipitates were each dried and dissolved in distilled water (10–12 weight percent) and one mole equivalent of sodium hydroxide was added to each maleimide polymer precipitate. The maleimide polymers in the precipitate were hydrolyzed at 85° C. for 10 to 12 hours to produce the alkali metal polymaleimide salts which were then lyophilized. For further purification, the alkali metal polymaleimide salts were then dissolved in distilled water (10–12 weight percent) and precipitated in ethanol for purification. NMR, chelation, and GPC analyses were then performed on the polymers.

Polymerization of maleimide was very rapid and the maleimide polymers had both C—N and C—C connected maleimide monomer units which were maintained when the maleimide polymers were hydrolyzed to form their corresponding alkali metal polymaleimide salts. Depending on the bond that was hydrolyzed, hydrolysis of a C—N connected maleimide monomer gave either an alpha or a beta form (FIG. 1). The structures of the alkali metal polymaleimide salts were determined by NMR.

Figure 3:
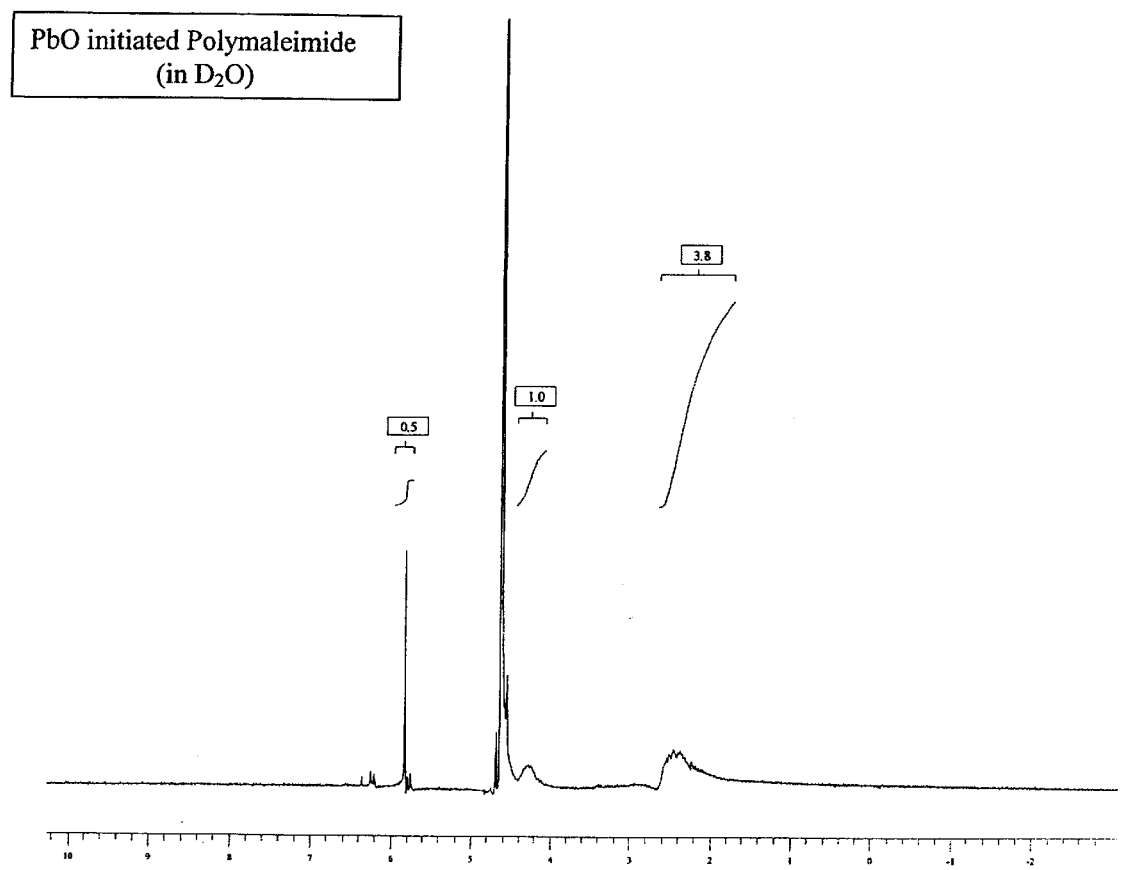
FIG. 3 is a 1H NMR spectra of an alkali metal polymaleimide salt made by the bulk polymerization process using a PbO-alcohol initiator.

$^1$H NMR was used to calculate the ratio of C—N and C—C connections in the alkali metal polymaleimide salt and the ratio of the alpha and beta forms in the alkali metal polymaleimide salt. FIG. 3 shows the $^1$H NMR spectrum for a alkali metal polymaleimide salt made with the PbO-alcohol initiator. The peak around 4.5 ppm was from protons of the C—N connected monomer (a and 1' of FIG. 1). The peak at 2.5 ppm was the combination of protons from the C—N and C—C connected monomers (b, b', c, and c' of FIG. 1). Therefore, the percent of C—N connected monomers was determined to be 40% from the integration of the two peaks according to Wolk et al. (Macromol. 27: 7613–7620 (1994)). There were some small peaks between 5.5 and 6.5 ppm that corresponded to end groups on the alkali metal polymaleimide salts. Because of water peak overlap, the ratio of the alpha and beta forms was not calculated.

Gel permeation chromatography was used for determining the molecular weight of the alkali metal polymaleimide salts. The sodium salts of polyacrylic acid have molecular structures similar to the alkali metal polymaleimide salts and, therefore, were used as the standards herein. A calibration curve was generated with four standards and molecular weights of the alkali metal polymaleimide salts were determined from the curve. The molecular weight average for the alkali metal polymaleimide salts was determined to be around 11,600.

EXAMPLE 2

This example illustrates the anionic polymerization of maleimide initiated with KOH (Kojima et al., J. Polym. Sci. Polym. A-1 1: 1121–1131 (1966); Tawney et al., J. Org. Chem. 26: 15–21 (1961); Bamford and Burley, Polymers 14: 395 (1973); Haas et al., J. Polym. Sci. Polym. Chem. Ed. 11: 327–343 (1973); Haas, J. Polym. Sci. Polym. Chem. Ed. 11: 315–318 (1973): Haas et al., J. Polym. Sci. Polym. Chem. Ed. 13: 2327–2334 (1975); Decker, Die Makromolek. Chemie 168: 51–58 (1973); Bamford et al., Trans. Faraday Soc. 66: 2612–2621 (1970)) and the subsequent alkaline hydrolysis of the maleimide polymer to an alkali metal polymaleimide salt.

Twenty grams of maleimide was added to a beaker placed in an ice-water bath. A solution of KOH (2.5 g) in 2 mL of distilled water was then added to the maleimide in the beaker and the resulting slurry was continuously stirred with a glass rod. As the reaction progressed, the color of the slurry changed from white to yellow and finally to red signifying that the maleimide polymer had been produced. The reaction was complete in less than a minute. The beaker was removed from the ice-water bath and the contents heated on a hot plate at about 80° C. for 2 hours or to dryness.

Next, the maleimide polymer was dissolved in distilled water (10–12 weight percent) and one mole equivalent of sodium hydroxide was added. The maleimide polymer was hydrolyzed at 85° C. for 10 to 12 hours and then lyophilized. The resulting alkali metal polymaleimide salt was then dissolved in distilled water (10–12 weight percent) and precipitated in ethanol for purification. NMR, chelation, and GPC analyses were then performed on the alkali metal polymaleimide salt.

Figure 2:
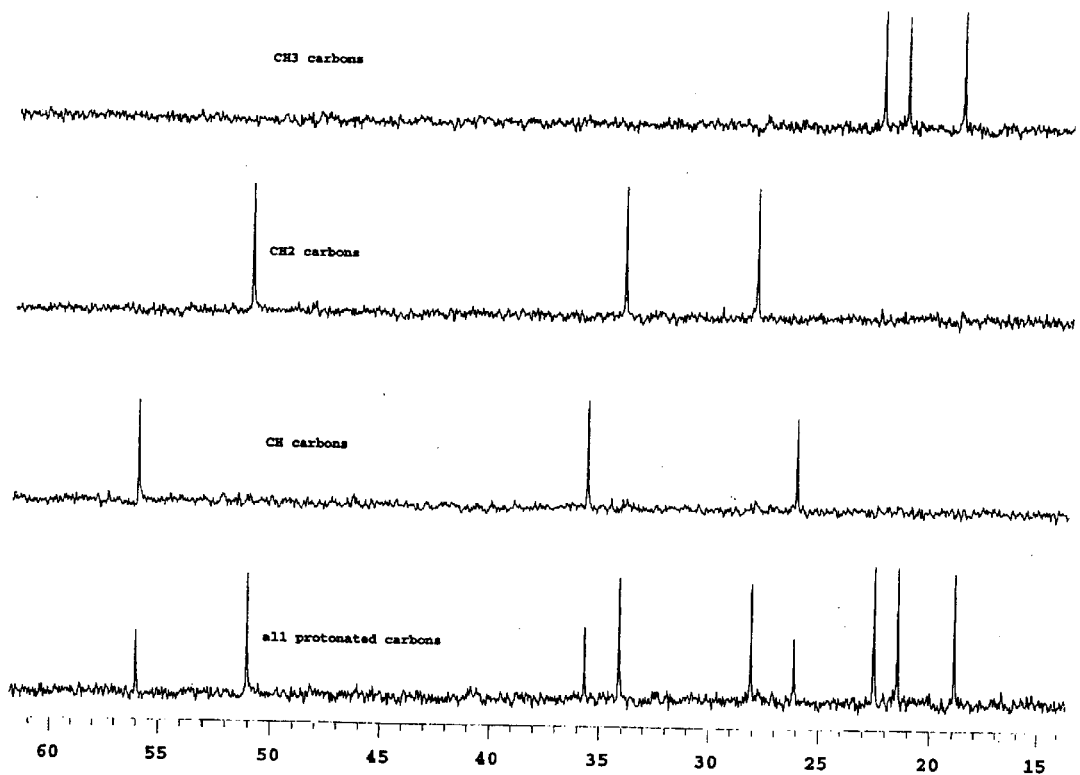
FIG. 2 is a DEPT spectrum of an alkali metal polymaleimide salt made by the anionic polymerization process using a KOH initiator.

A directionless enhancement by polarization transfer (DEPT) spectrum of the alkali metal polymaleimide salt is shown in FIG. 2. The $CH_2$ peak at 34 ppm and the CH peak at 56 ppm indicated that the alkali metal polymaleimide salt contained C—N connected monomers since the C—H carbon was attached to N and, therefore, quite deshielded. The CH peak at 36 ppm indicated that the alkali metal polymaleimide salt also contained C—C connected monomers. The percent of C—N bonds was determined to be about 80%.

Gel permeation chromatography was used as in Example 1 for determining the molecular weight of the alkali metal polymaleimide salt. The molecular weight average was about 1,100.

EXAMPLE 3

This example illustrates the anionic polymerization of maleimide in ethanol and the subsequent alkaline hydrolysis of the maleimide polymer to an alkali metal polymaleimide salt.

Five grams of maleimide was dissolved in 25 mL ethanol at 70° C. in a round bottom flask (the temperature was controlled by an oil bath). A solution of KOH (0.35 g in 10 mL ethanol) was then added and the contents were maintained at 70° C. for 2 hours. As the reaction progressed, the color of the slurry changed from colorless to red followed by formation of a pink precipitate. The pink precipitate (maleimide polymer) was filtered immediately and then dried in an oven at about 80° C.

Next, the maleimide polymer was dissolved in distilled water (10–12 weight percent) and one mole equivalent of sodium hydroxide was added. The maleimide polymer was hydrolyzed at 85° C. for 10 to 12 hours and then lyophilized. The resulting alkali metal polymaleimide salt was then dissolved in distilled water (10–12 weight percent) and precipitated in ethanol for purification. NMR, chelation, and GPC analyses were then performed on the alkali metal polymaleimide salt.

Gel permeation chromatography was used as in Example 1 for determining the molecular weight of the alkali metal polymaleimide salt. The molecular weight average was about 4,000.

EXAMPLE 4

This example shows that the alkali metal polymaleimide salts are effective at inhibiting calcium carbonate precipitation. The ability of the alkali metal polymaleimide salts to act as inhibitors of calcium carbonate precipitation was determined by calcium re-deposition analysis which measures the consumption of sodium hydroxide and the drop in pH effected by a polymer. The alkali metal polymaleimide salt were compared to ACUSOL, a commercial detergent builder.

The calcium re-deposition analysis was performed as described in U.S. Pat. No. 5,152,902 to Koskan et al. Briefly, a solution containing a 70 ml aliquot of 0.015 M $CaCl_2$ solution and 0.5 ml of alkali metal polymaleimide salt solution (100 ppm) was prepared in a beaker. The solution was stirred and 10 ml of 0.01 M sodium bicarbonate was added. The solution was titrated with 0.1 M sodium hydroxide with constant stirring until the mixture became turbid. The solution pH before and 10 minutes after the addition of the sodium hydroxide solution was determined. Also determined was the amount of sodium hydroxide needed for titration. The results for several alkali metal polymaleimide salts are shown in Table 1.

In general, the higher the amount of NaOH consumed and the smaller the pH drop, the more effective is the alkali metal polymaleimide salt at inhibiting calcium carbonate precipitation. The alkali metal polymaleimide salt produced using the PbO-alcohol initiator process required the maximum amount of sodium hydroxide and had the lowest pH drop of all the polymers analyzed. Therefore, the results indicate that alkali metal polymaleimide salts produced by the PbO-alcohol initiator process are the most effective inhibitors of calcium carbonate precipitation.

TABLE 1

Comparison of the Chelating Behavior of Various Polymers

| No. | Inhibitor (polymer) | Vol. NaOH sol. used (mL) | Change in pH |
|---|---|---|---|
| 1 | Base catalyzed PMI | 2.475 ± 0.005 | 1.04 ± 0.05 |
| 2 | PbO-alcohol catalyzed PMI | 2.925 ± 0.01 | 0.65 ± 0.07 |
| 3 | ACUSOL | 2.470 ± 0.005 | 0.95 ± 0.05 |
| 4 | Cu(tpp)$_2$NO$_3$-alcohol catalyzed PMI | 2.300 ± 0.005 | 0.75 ± 0.05 |

PMI is alkali metal polymaleimide salt.

EXAMPLE 5

This example shows that the alkali metal polymaleimide salts are effective as anti-scaling agents. The effectiveness was determined using a calcium chelation analysis of the alkali metal polymaleimide salts using the calcium selective electrode (Craggs et al., Analyst 104: 961–972 (1979)).

The performance of polymers as detergent builders can be determined by calcium chelation analysis. The basis is that a calcium selective electrode only measures free calcium ions and is insensitive to chelated (bound) calcium ions. The lower the concentration of free calcium ions in the presence of a polymer, the stronger the calcium chelation ability of the polymer.

A series of calcium standard solutions (10–100 ppm as CaCO$_3$) were used to make the calibration curve needed to determine the calcium concentration in the presence of polymer solution. A stock solution of 0.01 M CaCl$_2$ (1000 ppm, hardness as CaCO$_3$) was prepared by dissolving 0.1109 g CaCl$_2$ in 100 ml of MILLI-Q water (MILLI-Q is a trademark of the Millipore Corporation) and then diluted to give the appropriate standard solution. To prepare stock solutions of each of the alkali metal polymaleimide salt prepared in Examples 1, 2, or 3 and sodium polyaspartate as the standard, 0.05 g of the alkali metal polymaleimide salt or sodium polyaspartate was dissolved in 25 ml MILLI-Q water.

Potentiometric measurements were preformed with the calcium selective 97-20 IONPLUS electrode from Orion Research, Inc. The electrode was immersed in 50 ml of 200 ppm calcium solution at 25° C. and the solution continuously stirred using a magnetic stir bar. The polymer solution was added to the calcium solution in incremental amounts (0.5 ml) and for each incremental amount added to the calcium solution, the equilibrium value of the free calcium ions was noted after allowing the reading to stabilize. When the potential value dropped below 10 ppm, the addition of polymer was stopped. The data for each was normalized with respect to the calibration curve and compared to the data produced by the other polymers.

Figure 4:
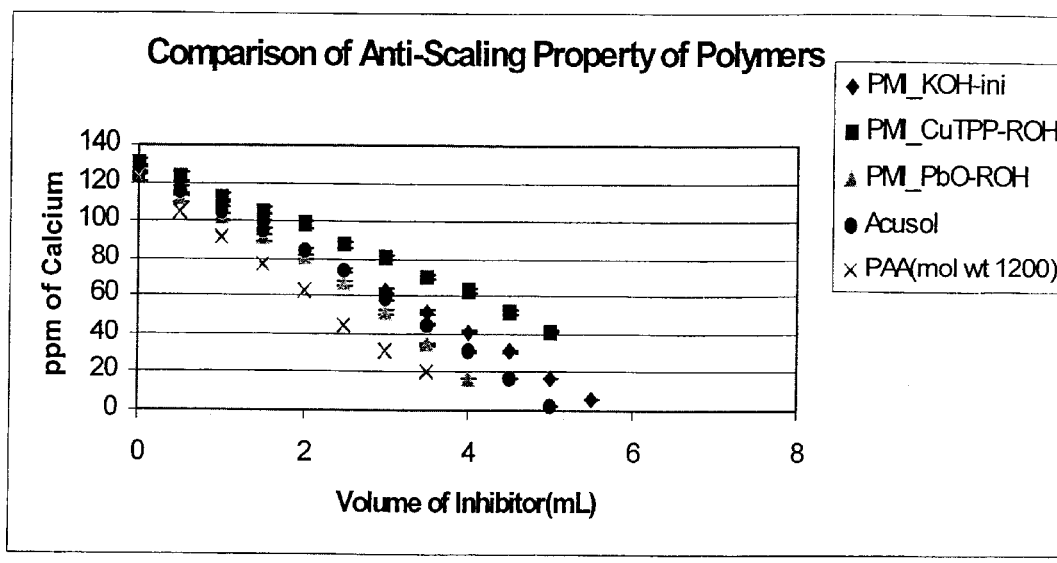
FIG. 4 is a graph of a chelation analysis of several alkali metal polymaleimide salts using a calcium selective electrode that shows their effectiveness as anti-scaling agents.

The results of the calcium chelation analyses are shown in FIG. 4. The calibration curve generated with several of the standard calcium solutions produced a straight-line plot. Concentration of free calcium ions after addition of a known amount of polymer solution was determined from the calibration curve. The curves for the different polymer solutions show that the alkali metal polymaleimide salt (PMI_PbO—ROH), which had been prepared using the metal oxide-alcohol initiator (PbO—ROH), had the best chelation ability. Therefore, alkali metal polymaleimide salts produced by the metal-oxide alcohol initiator polymerization process (Example 1) are more efficient anti-scaling agents than alkali metal polymaleimide salt produced by the anionic polymerization process (Examples 2 and 3). The results are consistent with the results of the calcium re-deposition analysis of Example 4.

The difference in the properties of the alkali metal polymaleimide salts as shown in this Example and in Example 4 is because of difference in the molecular weight of the alkali metal polymaleimide salts and the percentage of C—N connected maleimide-derived monomers in the polymers. Because the bulk polymerization process using metal oxide-alcohol initiators (Example 1) produced alkali metal polymaleimide salts with better properties with respect to chelation and the alkali metal polymaleimide salts had about 60% C—C connected monomers whereas the alkali metal polymaleimide salts produced by anionic polymerization (Examples 2 and 3) had about 20% C—C connected monomers, it appears that the C—C connected monomers provide donor sites that are more accessible than the C—N connected monomers.

The results of Examples 4 and 5 also show that the higher the molecular weight of the polymer, the more effective the polymer is for detergent builder applications. The average molecular weight of the alkali metal polymaleimide salts produced by the bulk polymerization process using a metal oxide-alcohol initiator was about 11,600 whereas the average molecular weight of the alkali metal polymaleimide salts produced by the anionic polymerization process was between about 1,100 to 4,000. The results of Examples 4 and 5 show that a simple and economical method for the synthesis of alkali metal polymaleimide salts has been developed. Examples 4 and 5 also show fast and convenient methods have been developed for evaluating the properties of the alkali metal polymaleimide salts. Also shown herein is an improved analytical method which uses electrochemical methods to exploit the reduction current of oxygen to analyze surface scaling in a rotating disc electrode.

EXAMPLE 6

This Example compares the polyamide salt of Example 1 with a standard-polyacrylate polymer for effectiveness in preventing encrustation and soil redeposition in a ten cycle TERG-O-TOMETER test using a carbonate built detergent and hard water.

Samples Tested:

| | |
|---|---|
| Polymaleimide | 10% solution |
| ACUSOL 445N 4500 mw polyacrylate | 45% solution |

Summary of Results

Encrustation control by the experimental polymer was as good as with the standard polyacrylate. The calcium carbonate buildup was very low and ranged from 0.4 to 0.5 percent. From past tests 0.3% is almost complete control. With no control, limestone levels can reach 8 to 12 percent, depending on formulation and other factors.

Soil redeposition on the three fabrics was comparable for the experimental and for the standard polyacrylate polymers. Although the amount of soil redeposition was high, it is not unusual in this screening test.

Results with the polymaleimide salt are positive.

Testing

Encrustation and redeposition of soils can be measured simultaneously. Separate swatches of fabrics are used for the two different measurements. The presence of soil makes the encrustation measurements more realistic since the soils have an effect on deposition of limestone on the cotton fabrics. Water hardness is high to accentuate encrustation by calcium carbonate. At the end of the wash cycle the pH of the wash bath was measured and recorded. Usually the TERG-O-METER test is used only for screening products in preparation for more extensive washing machine and in home testing.

| TEST FORMULATION | |
|---|---|
| | Active Percent |
| LAS[1] (VISTA C 560 (68%)) | 15% |
| Nonionic (SHELL NEODOL 25-7) | 7% |
| Soda Ash (FMC Sodium Carbonate) | 25% |
| Zeolite A (PQ VALFOR 100) | 25% |
| CMC (Penn Carbose Carboxy Methyl Cellulose) | 2% |
| Polymaleimide | 3 & 5%; or |
| Polyacrylate, ACUSOL 445N (45%) - Balance water | 3 & 5% |

[1]Linear alkylbenzene sulfonates (C11–C13) non-soap ionic surfactant

Encrustation

The laboratory TERG-O-TOMETER is used for the wash and rinse cycles in the combined procedure. Water with 300 ppm hardness is placed in the pots and the detergent ingredients are added. After the dissolution time, the soils are added and allowed several seconds to disperse. A check is made to ensure that the soils and detergent are dispersed before adding the cloth swatches. Following the wash and rinse cycles excess water is squeezed out by hand.

Limestone encrustation is determined as calcium carbonate weight percent after drying the swatches to constant weight at 100° C. A triple extraction of the swatch with 25 ml of 0.2 N HCl is used to get complete extraction of the calcium carbonate deposit from the cotton swatches after 0, 1, 5 and 10 cycles. An aliquot of the extract is titrated with EDTA and percent calcium carbonate is calculated.

Anti-Redeposition Activity

The guidelines of ASTM D 4008 were followed for the redeposition part of the experiment to measure the relative ability of detergent formulations to prevent soil deposition onto three fabrics. Encrustation by calcium carbonate was measured at the same time. Rather than use soiled cloth to supply the soil for redeposition, the soil is added directly to the wash bath. The soils are the standard soiling media used to prepare Scientific Services soiled cloths, i.e., dust-sebum emulsion and clay slurry. The test requires multiple exposure to build up a measurable level of redeposited soil. Ten sequential laundry cycles were run in these tests.

The laboratory TERG-O-TOMETER is used for the wash and rinse cycles. Swatches of prewashed cloth are laundered ten consecutive times with hard water and formula chemicals. The swatches are oven dried for 15 minutes @ 170° F. before the next cycle.

The swatches were coded and reflectances were measured with a BYK-GARDNER COLORGARD SYSTEM/05 reflectometer using the "L" scale. Reflectances were read on the clean cloths and after cycles 1, 5 and 10 of washing and drying were read again, stacking and orienting the swatches the same way. Results are reported as delta L. Cumulation of deposition results vs. cycle gives the best picture of soil buildup since cycle to cycle variations often occur.

| LAUNDRY CONDITIONS | |
|---|---|
| Wash Temperature | 100° F. |
| Water Hardness | 300 ppm Ca/Mg 2/1 |
| Detergent Concentration | 1.0 g/liter |
| TERG-O-TOMETER Speed | 100 cpm |
| Detergent Dissolve Time | 2 min. |
| Wash Time | 10 min |
| Rinse Time | 5 min |
| Rinse Temp. | Ambient |
| Cloth Load | 10 swatches each prewashed cotton #400, 2 swatches Cot.P.E.D.P #7435 WRL and 2 swatches Polyester #777. 14 - 3" x 4" washed, clean, swatches with fresh coded cotton swatches added after 1 and 5 cycles. |
| Soil Load | 3.09 g Scientific Services Dust-Sebum emulsion 1.81 g Scientific Services Clay Slurry |
| Number of wash cycles | 10 |
| Drying Conditions | 170° F. in circulating oven for 15 min between cycles. |

Results & Discussion

The results of the tests are contained in the following Tables 2, 3, 4 and 5.

TABLE 2

Encrustation Measurements
Calcium Carbonate Extraction Results

| Swatch # | Cycle # | Swatch Wt. | Avg Titration | % Calcium Carbonate |
|---|---|---|---|---|
| X 31 | 0 | 0.826 | 0.32 | 0.22 |
| X 32 | 1 | 0.813 | 0.50 | 0.35 |
| X 33 | 5 | 0.774 | 0.42 | 0.31 |

TABLE 2-continued

Encrustation Measurements
Calcium Carbonate Extraction Results

| Swatch # | Cycle # | Swatch Wt. | Avg Titration | % Calcium Carbonate |
|---|---|---|---|---|
| X 34 | 10 | 0.728 | 0.62 | 0.49 |
| X 35 | 10 | 0.733 | 0.67 | 0.53 |
| X 51 | 0 | 0.791 | 0.50 | 0.37 |
| X 52 | 1 | 0.799 | 0.40 | 0.29 |
| X 53 | 5 | 0.767 | 0.67 | 0.50 |
| X 54 | 10 | 0.718 | 0.50 | 0.40 |
| X 55 | 10 | 0.749 | 0.57 | 0.44 |
| C 31 | 0 | 0.778 | 0.20 | 0.15 |
| C 32 | 1 | 0.773 | 0.43 | 0.32 |
| C 33 | 5 | 0.706 | 0.50 | 0.41 |
| C 34 | 10 | 0.717 | 0.47 | 0.38 |
| C 35 | 10 | 0.754 | 0.58 | 0.45 |
| C 51 | 0 | 0.791 | 0.32 | 0.23 |
| C 52 | 1 | 0.787 | 0.52 | 0.38 |
| C 53 | 5 | 0.774 | 0.50 | 0.37 |
| C 54 | 10 | 0.715 | 0.50 | 0.40 |
| C 55 | 10 | 0.756 | 0.53 | 0.41 |
| Previous Work - High encrustation | | | | |
| No Polymer - O 14 | 9 | 0.777 | 4.87 | 3.62 |
| No Polymer - J 14 | 9 | 0.742 | 6.50 | 5.07 |
| Blank | No Extraction - just solutions | | 0.06 | |

TABLE 3

CaCO$_3$ Encrustation After 1, 5 and 10 Cycles

| Polymer % Sample No. | 3% Exp Polymaleide SS#3673 | 5% Exp Polymaleide SS#3673 | 3% PAA ACUSOL SS#3394 | 5% PAA ACUSOL SS#3394 |
|---|---|---|---|---|
| Cycle 0 | 0.22 | 0.37 | 0.15 | 0.23 |
| Cycle 1 | 0.35 | 0.29 | 0.32 | 0.38 |
| Cycle 5 | 0.31 | 0.50 | 0.41 | 0.37 |
| Cycle 10 | 0.49 | 0.40 | 0.38 | 0.40 |
| Cycle 10 | 0.53 | 0.44 | 0.45 | 0.41 |

TABLE 4

Soil redeposition Reflectance Readings

| | | Original | Ex3 | Original | Ex5 | Original | C3 | Original | C5 | Original Avg Clean | Original Std Dev |
|---|---|---|---|---|---|---|---|---|---|---|---|
| After Cycle 1 | | | | | | | | | | | |
| cotton 1 | | | 94.70 | | 94.63 | | 94.70 | | 94.86 Cot | 94.77 | 0.11 |
| cotton 2 | | 94.64 | 93.70 | 94.88 | 93.58 | 94.91 | 94.11 | 94.81 | 94.03 | | |
| Delta | | | -0.94 | | -1.30 | | -0.80 | | -0.78 | | |
| | cot 12 | 94.82 | 93.77 | 94.74 | 93.84 | 94.72 | 93.94 | 94.95 | 93.98 Cot | 94.81 | 0.08 |
| | cot 13 | 94.77 | 93.79 | 94.77 | 93.83 | 94.78 | 93.87 | 94.91 | 93.77 | | |
| Cotton Delta | | | -1.01 | | -0.92 | | -0.84 | | -1.06 | | |
| | c/p 14 | 93.16 | 92.16 | 93.07 | 92.21 | 93.03 | 92.16 | 93.10 | 91.90 CP | 93.14 | 0.09 |
| | c/p 15 | 93.24 | 92.09 | 93.20 | 92.20 | 93.07 | 92.19 | 93.27 | 92.04 | | |
| Cotton Poly Delta | | | -1.08 | | -0.93 | | -0.88 | | -1.22 | | |
| | pe 16 | 93.24 | 91.97 | 93.46 | 92.27 | 93.40 | 92.33 | 93.32 | 92.33 PE | 93.40 | 0.08 |
| | pe 17 | 93.41 | 91.90 | 93.41 | 92.30 | 93.44 | 92.35 | 93.51 | 91.99 | | |
| Polyester Delta | | | -1.39 | | -1.15 | | -1.08 | | -1.26 | | |
| After Cycle 5 | | | | | | | | | | | |
| cotton 3 | | | 94.76 | 92.75 | 94.72 | 91.73 | 94.77 | 91.68 | 94.92 | 92.25 | |
| Delta | | | -2.01 | | -2.99 | | -3.09 | | -2.67 | | |
| | cot 12 | | 92.56 | | 92.06 | | 92.07 | | 91.91 | | |
| | cot 13 | | 92.54 | | 91.84 | | 91.78 | | 92.01 | | |
| Cotton Delta | | | -2.24 | | -2.80 | | -2.83 | | -2.97 | | |
| | c/p 14 | | 91.55 | | 91.28 | | 91.06 | | 91.13 | | |
| | c/p 15 | | 91.33 | | 91.15 | | 91.12 | | 90.96 | | |
| Cotton Poly Delta | | | -1.76 | | -1.92 | | -1.96 | | -2.14 | | |
| | pe 16 | | 91.56 | | 90.94 | | 91.54 | | 91.42 | | |
| | pe 17 | | 91.57 | | 90.87 | | 91.54 | | 91.13 | | |
| Polyester Delta | | | -1.76 | | -2.53 | | -1.88 | | -2.14 | | |

TABLE 4-continued

Soil redeposition Reflectance Readings

|  | | Original | Ex3 | Original | Ex5 | Original | C3 | Original | C5 | Original Avg Clean | Original Std Dev |
|---|---|---|---|---|---|---|---|---|---|---|---|
| After Cycle 10 | | | | | | | | | | | |
| cotton 4 | | | 94.81 | 90.65 | 94.73 | 90.81 | 94.79 | 89.72 | 94.91 | 89.26 | |
| cotton 5 | | | 94.62 | 91.37 | 94.91 | 91.23 | 94.86 | 89.94 | 94.77 | 88.98 | |
| Delta | | | | −3.71 | | −3.80 | | −5.00 | | −5.72 | |
| | cot 12 | | | 91.17 | | 90.90 | | 90.32 | | 89.28 | |
| | cot 13 | | | 90.82 | | 90.86 | | 89.84 | | 88.94 | |
| Cotton Delta | | | | −3.80 | | −3.88 | | −4.67 | | −5.82 | |
| | c/p 14 | | | 91.03 | | 90.59 | | 90.14 | | 89.95 | |
| | c/p 15 | | | 90.88 | | 90.72 | | 90.17 | | 89.78 | |
| Cotton Poly Delta | | | | −2.25 | | −2.48 | | −2.90 | | −3.32 | |
| | pe 16 | | | 90.45 | | 90.25 | | 89.93 | | 89.51 | |
| | pe 17 | | | 90.42 | | 89.92 | | 89.87 | | 88.88 | |
| Polyester Delta | | | | −2.89 | | −3.35 | | −3.52 | | −4.22 | |

TABLE 5

Redeposition Scores from Ten Cycle Test

| | | Delta L Results | 3% | 5% | 3% ACUSOL | 5% ACUSOL |
|---|---|---|---|---|---|---|
| | | Fabric | Polyimide | Polyimide | Polyacrylate | Polyacrylate |
| Cycle 1 | Cycle 1 | Cyc 1 Cotton | −0.98 | −1.11 | −0.82 | −0.92 |
| Cycle 5 | | C/P | −1.08 | −0.93 | −0.88 | −1.21 |
| Cycle 10 | | PE | −1.39 | −1.15 | −1.08 | −1.26 |
| | | Total | −3.44 | −3.19 | −2.78 | −3.39 |
| | Cycle 5 | Cyc 5 Cotton | −2.13 | −2.90 | −2.96 | −2.82 |
| | | C/P | −1.76 | −1.92 | −1.96 | −2.14 |
| | | PE | −1.76 | −2.53 | −1.88 | −2.14 |
| | | Total | −5.65 | −7.35 | −6.80 | −7.10 |
| | Cycle 10 | Cyc 10 Cotton | −3.75 | −3.84 | −4.83 | −5.77 |
| | | C/P | −2.25 | −2.48 | −2.90 | −3.32 |
| | | PE | −2.89 | −3.35 | −3.52 | −4.22 |
| | | Total | −8.89 | −9.67 | −11.25 | −13.31 |
| | | Grand Total Score | −17.98 | −20.21 | −20.82 | 23.80 |

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

We claim:

1. A process for the preparation of an alkali metal poty-maleimide salt which comprises:
   (a) anhydrously polymerizing maleimide in the presence of a metal catalyst and any alcohol initiator to produce a inaleimide polymer wherein the maleimide polymer has mixed C—C and C—N bonds between maleimide-derived units of the maleimide polymer; and
   (b) hydrolyzing the maleimide polymer with an alkali metal base at 10 to 100° C. for at least 1 hour to produce the alkali metal polymaleimide salt.

2. The process of claim 1 wherein the maleimide polymer is polymerized by bulk polymerization.

3. The process of claim 1 wherein the maleimide polymer is polymerized in a solvent.

4. The process of claim 1 wherein the metal catalyst is selected from the group consisting of PbO, SnO, Sn(2-ethylhexanoate).

5. The process of claim 4 wherein the metal catalyst is PbO.

6. The process of claim 1 wherein the alcohol initiator is tert-butyl benzyl alcohol.

7. An alkali metal polymaleimicle salt prepared by the process of claim 1.

8. A process for the preparation of an alkali metal poly-maleimide salt which comprises:
   (a) polymerizing maleimide in an aqueous solution containing a base to produce a maleimide polymer wherein the maleimide polymer has mixed C—C and C—N bonds between maleimide-derived units of the maleimide polymer; and
   (b) hydrolyzing the maleimide polymer with an alkali metal base at 10 to 100° C. for at least 1 hour to produce the alkali metal polymaleimide salt.

9. The process of claim 8 wherein the base is KOH.

10. The process of claim 8 wherein the alkali metal base is NaCH.

11. An alkali metal polymaleimide salt prepared by the process of claim 8.

12. An alkali metal polymalsi-mide salt which comprises mixed C—C and C—N bonds between the maleimide derived units of the alkali metal polymaleimide salt.

13. In a detergent composition, the improvement which comprises an alkali metal polymaleimide salt which comprises mixed C—C and C—N bonds between maleimide-derived units of the alkali metal polymaleimide salt, wherein the alkali metal polymaleimide salt exchanges the alkali metal with calcium ions in water containing the detergent.

14. The detergent composition of claim 13 which contains at least 10% by weight of the alkali metal polymaleimide salt.

15. The detergent composition of claim 13 which contains up to 80% by weight of the alkali metal polymaleimide salt.

16. A process for the preparation of a maleimide polymer having mixed C—C and C—N bonds between maleimide-derived units of the maleimide polymer which comprises:

anhydrously polymerizing maleimide in the presence of a metal catalyst and any alcohol initiator to produce the maleimide polymer having the mixed C—C and C—N bonds between the maleimide-derived units of the maleimide polymer.

17. The process of claim 16 wherein the maleimide polymer is polymerized by bulk polymerization.

18. The process of claim 16 wherein the metal catalyst is selected from the group consisting of PbO, SnO, Sn(2-ethylhexanoate).

19. The process of claim 18 wherein the metal catalyst is PbO.

20. The process of claim 16 wherein the alcohol initiator is tert-butyl benryl alcohol.

21. The process of claim 16 wherein the maleimide polymer is polymerized in a solvent.

22. A maleimide polymer prepared by the process of claim 16.

23. A process for the preparation of a maleimide polymer having mixed C—C and C—N bonds between maleimide-derived units of the maleimide polymer which comprises:

polymerizing maleimide in an aqueous solution containing a base to produce the maleimide polymer having the mixed C—C and C—N bonds between the maleimide-derived units of the maleimide polymer.

24. The process of claim 23 wherein the base is KOH.

25. A maleimide polymer prepared by the process of claim 23.

* * * * *

UNITED STATES PATENT AND TRADEMARK OFFICE
CERTIFICATE OF CORRECTION

PATENT NO. : 6,878,797 B2
DATED : April 12, 2005
INVENTOR(S) : Kris A. Berglund et al.

It is certified that error appears in the above-identified patent and that said Letters Patent is hereby corrected as shown below:

<u>Column 15,</u>
Line 55, "a inaleimide polymer" should be -- maleimide polymer --.

<u>Column 16,</u>
Line 60, "is NaCH." should be -- is NaOH. --.
Line 63, "metal polymalsi-midesalt" should be -- metal polymaleimidesalt --.

<u>Column 18,</u>
Line 4, "is tert-butyl benryl alcohol." should be -- is tert-butyl benzyl alcohol. --.

Signed and Sealed this

Ninth Day of August, 2005

JON W. DUDAS
*Director of the United States Patent and Trademark Office*